Oct. 26, 1965  E. M. TAFT ETAL  3,213,669
AUTOMATIC SAMPLE COLLECTING APPARATUS
Filed Feb. 28, 1963  5 Sheets-Sheet 1

INVENTORS
EARLE M. TAFT
KEENE P. DIMICK
ARTHUR D. SUHR
HUBERT N. DIVELBISS
By Townsend and Townsend
attorneys Oct. 26, 1965 E. M. TAFT ETAL 3,213,669
AUTOMATIC SAMPLE COLLECTING APPARATUS
Filed Feb. 28, 1963 5 Sheets-Sheet 2

INVENTORS
EARLE M. TAFT
KEENE P. DIMICK
ARTHUR D. SUHR
HUBERT N. DIVELBISS
By Townsend and Townsend
attorneys Oct. 26, 1965   E. M. TAFT ETAL   3,213,669
AUTOMATIC SAMPLE COLLECTING APPARATUS
Filed Feb. 28, 1963   5 Sheets-Sheet 4

INVENTORS
EARLE M. TAFT
KEENE P. DIMICK
ARTHUR D. SUHR
HUBERT N. DIVELBISS
By Townsend and Townsend
attorneys

United States Patent Office 3,213,669
Patented Oct. 26, 1965

3,213,669
AUTOMATIC SAMPLE COLLECTING APPARATUS
Earle M. Taft, Lafayette, Keene P. Dimick, Santa Rosa, and Arthur D. Suhr and Hubert N. Divelbiss, Napa, Calif.; said Taft and said Dimick assignors to Wilkens Instrument & Research, Inc., Walnut Creek, Calif.
Filed Feb. 28, 1963, Ser. No. 261,609
18 Claims. (Cl. 73—23.1)

The present invention relates to an automatic sample collecting method and apparatus and more particularly to a method and apparatus for the automatic collection of the components of sample in a gas chromatograph.

The present invention is directed to a sample collection method and apparatus particularly adapted for use with a gas chromatograph for separately collecting the different components of a sample in individual collection bottles without contaminating the component in one bottle with any of the other components. While the invention is usable for collecting components in many different processes, the invention will be described herein with particular reference to a gas chromatograph.

According to the present invention to be described hereinafter in greater detail a plurality of collection bottles are provided at different positions around a circular table, and in response to a detector which analyzes the components of a sample passing through the column or fluid discharge tube of a chromatograph the table is alternately rotated and raised and lowered to place the end of the discharge tube successively into different collection bottles to collect in separate collection bottles the components passing out of the discharge tube at time spaced intervals. This method and apparatus avoids contamination of the component in any one bottle with other components since the particular desired component passing through the discharge tube at any one time is passed directly into a collection bottle which is separated from communication with the discharge tube once the run of that particular component has been completed. Thus, the contamination of components attendant with the distribution of all the components in the common manifold of the prior art is eliminated. Also, according to the present invention no valves which can deteriorate during use are required.

The present invention may be utilized to successively collect each of the different components of the sample in a separate collection bottle positioned in its turn around the table, or by placing the collection bottles in alternate slots in the rotating table heart cuts may be made by collecting just the main fraction of the components in the collection bottles and discarding or wasting the remainder of the sample through the open slots which are positioned in the table between successive collection bottles.

An important feature of the invention when certain components of the sample are collected in separate collection bottles lies in the fact that additional sample may be inserted into the chromatograph and the collection cycle repeated to yield ultra pure components in any desired size.

In a particular embodiment of the present invention, the means for stopping rotation of the table and for raising the table for insertion of the discharge tube into a collection bottle includes a lever arm provided with a roller portion on its one end. This roller portion rolls on the periphery of the table so that upon rotation of the table this roller portion rolls into an initial portion or notch of one of the slots in the table, and means responsive to this position of the lever arm stops rotation of the table and raises the table so that the discharge tube is inserted either into a collection bottle for collection of the component passing through the discharge tube or is inserted through a slot in the table for wasting the material issuing from the discharge tube.

Additionally, the apparatus is provided with short bypass clips which can be slidably inserted into certain of the table slots to prevent the lever roller portion from extending into that slot and thereby prevent the table from stopping at that slot. Additionally, a longer return clip is provided for insertion into the slot after the last collection bottle for initiating a new cycle.

Furthermore, according to the present invention, a novel sample collection bottle is provided having an upper chamber, a lower chamber, means providing communication between the bottom of the upper chamber and the top of the lower chamber and inlet and outlet tubes for the bottle. The inlet tube passes from the lower chamber vertically through the upper chamber to provide communication between the lower chamber and the exterior of the bottle for insertion of a sample to be collected into the bottle. The outlet tube projects out of the top of the upper chamber at an angle with respect to the inlet tube to provide communication between the top of the upper chamber and the exterior of the bottle for allowing air to escape from the bottle when the bottle is being filled. Additionally, on the end of the outlet tube is provided a vent cap which has a pressure exit opening that moves from a closed position to an open position when horizontal pressure is applied against the vent cap. Thus, when this novel sample collection bottle is supported in a slot of the collection table and the table raised for insertion of the fluid discharge tube into the inlet tube, the lever arm projecting into the initial portion of the slot applies pressure against the vent cap to open the pressure exit opening in order to avoid pressure build-up in the collection bottle.

Also, the fluid discharge tube is provided with a tubular needle insert at its output end for piercing a cover cap on the top of the collection bottle. This construction permits the collection bottles to remain sealed against contamination from atmospheric air and still avoid pressure surges during piercing of the bottle cover by the discharge tube needle insert.

Other objects and features and advantages of the present invention will become apparent upon reading the following specification and referring to the accompanying drawings in which similar characters of reference represent corresponding parts in each of the several views.

Figure 1:
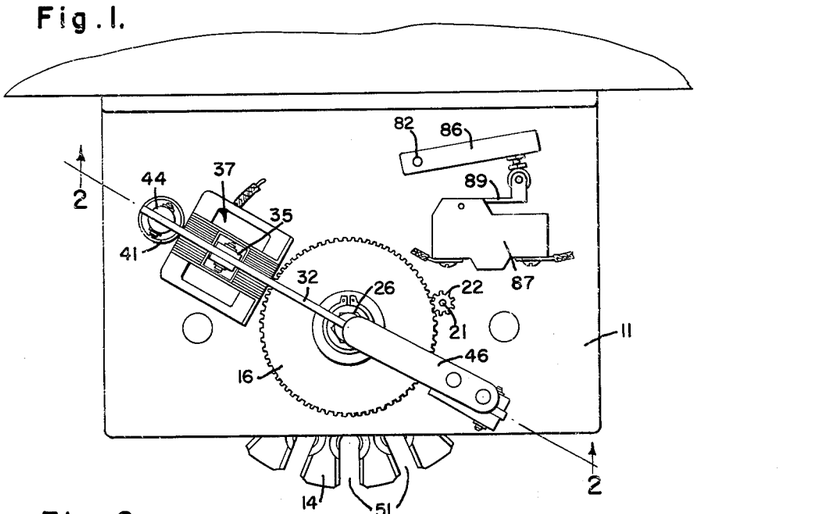
FIG. 1 is a plan view illustrating apparatus according to the present invention.
Figure 2:
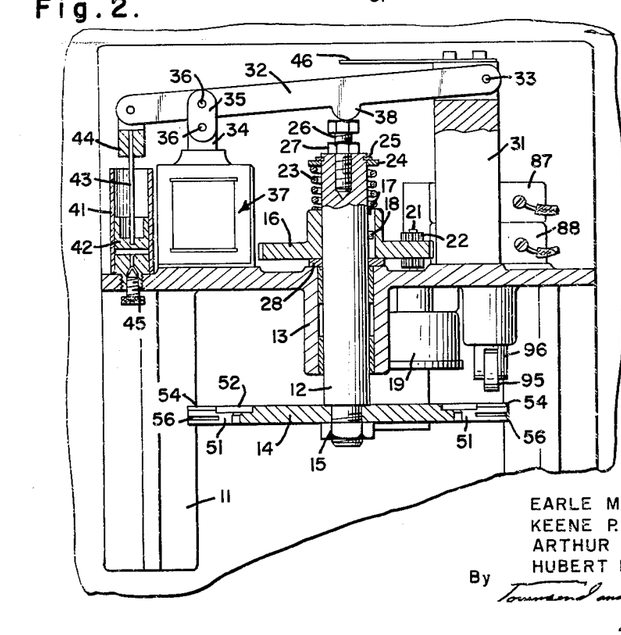
FIG. 2 is a side sectional view of a portion of the structure shown in FIG. 1 taken along line 2—2 and showing the collection bottle table in lowered position.
Figure 3:
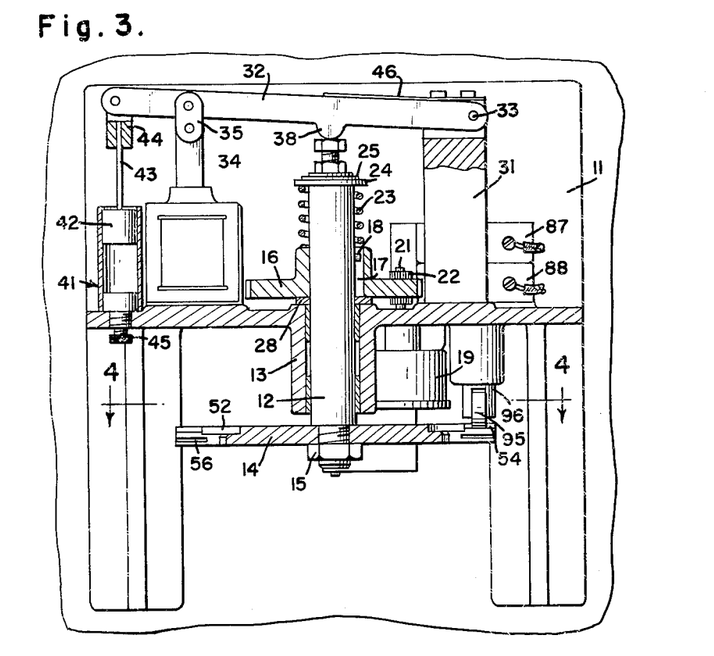
FIG. 3 is a view similar to FIG. 2 showing the collection bottle table in elevated position.

Referring now to the drawing with particular reference to FIGS. 1–3, the sample collection apparatus according to the present invention includes a main frame 11 on which a vertical table drive shaft 12 is supported by means of a bearing housing 13. The table drive shaft 12 is capable of rotary and vertical linear motion as described in greater detail below.

Horizontally positioned at the lower end of the table drive shaft 12 by means of a retaining nut 15 is a circular collector table 14 concentrically mounted on the drive shaft 12 for rotary and vertical linear movement with the drive shaft. The collector table 14 is constructed and arranged to support a plurality of collection bottles in the manner described in detail below.

The drive shaft 12 is driven by a gear 16 which has gear teeth provided on its outer periphery and a vertical key way 17 provided on its inner periphery for cooperation with a key 18 on the drive shaft 12. Power is transmitted to the gear 16 from a motor 19 by means of a motor shaft 21 provided on its end with a pinion 22 which engages the gear teeth on the outer periphery of the gear 16.

The drive shaft 12 which is movable vertically by means of movement of the key 18 in the keyway 17 is continuously urged upwardly by a helical table return spring 23 the bottom of which bears against the top surface of the gear 16 and the top of which bears against a washer 24 held adjacent the upper end of the shaft 12 by means of a snap ring 25. An adjusting screw 26 is threaded into a threaded bore in the top end of the drive shaft 12 and is locked in place by a lock nut 27. An anti-friction washer 28 of, for example, Teflon, is positioned between the bottom surface of the gear 16 and the top surface of the bearing housing 13 to permit easy rotation of the drive shaft 12.

A bracket 31 positioned on the frame 11 extends above the upper end of the shaft 12 and with a pin 33 rotatably supports one end of a lever rod 32 which extends across the top of the screw 26 in the shaft 12. Near the opposite end of the lever rod 32 from the pivot pin 33 is rotatably supported a solenoid plunger 34 by means of a link 35 and pivot pins 36 and 36'. A solenoid 37 surrounding the solenoid plunger 36 is fixedly secured to the frame 11. Between the pivot pins 33 and 36' a button portion 38 of the lever rod 32 contacts the upper surface of the screw 26 for applying a downard force to the shaft 12.

Upon energizing the solenoid 37 the solenoid plunger 34 is pulled down and causes the button portion 38 of the lever rod 32 to force the drive shaft 12 vertically downward compressing the spring 23. Upon deenergizing the solenoid 37, the plunger 34 is released and the return spring 23 causes the drive shaft 12 to move vertically upward.

In order to provide a smooth and gradual movement of the lever rod 32 an air pot 41 is mounted on the frame 11 and is provided with an air pot piston 42 which is secured by a connecting rod 43 and a clevis 44 to the end of the lever rod 32 opposite the end attached to the bracket 31. An escapement adjustment screw 45 is provided for adjusting the flow of air into and from the air pot 41. Also, a flat leaf spring 46 is secured to the bracket 31 and contacts the upper surface of the lever rod 32 during its upward movement to further cushion upward movement of the shaft 12 as it nears the end of its stroke.

The collection table 14 shown in FIGS. 1, 4 and 8–10 is provided with a plurality of radial slots 51 equally spaced about the circumference. The slots 51 are of equal length and at the interior-most portion of each of the slots 51 an annular recess 52 is provided in the top surface of the table 14 for holding a collection bottle. A washer 53 of resilient material such as, for example, rubber is secured as by cement in the bottom of the recess 52 to cushion the collection bottles on the table 14. The top edges of the slots 51 are beveled as at 54 for cooperation with positioning rollers to be described in detail below.

The edges of the slots 51 at the periphery of the table 14 are also beveled to provide a timing notch at the initial portion of each of the slots 51 to receive a timing roller. In each slot a horizontal groove 56 (see FIG. 10) extends radially inwardly from the periphery of table 14 to a region adjacent the recess 52 and is adapted to receive a clip member of the type described below for proper timing of the operating cycle.

Figure 11:
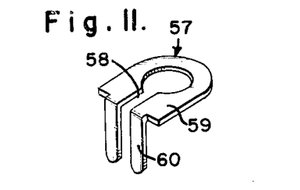
FIG. 11 is an enlarged perspective view of a clip adapted to be inserted in a groove in the table.

FIG. 11 is a perspective view of a thin by-pass clip member 57 which has a central slot extending substantially the length of a horizontal main body portion 59 and vertically extending face prongs 60 at the front face thereof. The clip member 57 is inserted into the groove 56 in one of the slots 51 and is held in place by spring action so that the face prongs 60 are positioned substantially at the periphery of the table 14 to effectively close the notch in the initial portion of the slot 51. A return clip member 57' (see FIG. 4) is constructed similar to the by-pass clip 57 but is provided with a longer main body portion 59' so that the face prongs 60' extend radially outwardly from the periphery of the table 14 for actuating apparatus associated with the sample collection apparatus to end one cycle of the collection apparatus and begin another as set forth in greater detail below.

Into certain of the radial slots 51 are inserted collection bottle 61 (see FIGS. 5 and 6) which have an upper chamber 62, a lower chamber 63 and a communication passage 64 providing fluid communication between the bottom of the upper chamber 62 and the top of the lower chamber 63. A vertically aligned inlet tube 65 provided with a radially outwardly extending lip 66 at the top end thereof and a neck 65' extending from the top of the bottle 61 projects through the upper chamber and the passage 64 into the lower chamber 63 to provide communication between the lower chamber 63 and the exterior of the bottle 61. A bottle sealing cap 67 of, for example, rubber is provided on the top of the inlet tube 65. Also, an outlet tube 68 projects outwardly from the upper chamber at an angle with respect to the inlet tube 65 for providing communication between the top of the upper chamber and the exterior of the bottle 61. A vent cap 69 of, for example, rubber which has a pressure exit opening 71 cut transversely therein is provided on the outer end of the outlet tube 68 and, under normal conditions, the pressure exit opening 71 is closed. However, horizontal pressure applied to the side of the vent cap 69 opens the exit opening 71 for permitting carrier gas to escape from the upper chamber 62. The upper chamber 62 is filled with a scrubber material 70 such as, for example, glass wool. A helical spring 72 is provided on the bottle neck 65' and applies pressure against a washer 73 to force the washer 73 in the direction of the lip 66 of the collection bottle. The collection bottle 61 is supported on the table 14 by compressing the spring 72, sliding the neck 65' in one of the slots 51 until the lip 66 is positioned in the annular recess 52 and then releasing the spring 72 so that the bottle is resiliently held onto the table 14.

Figure 12:
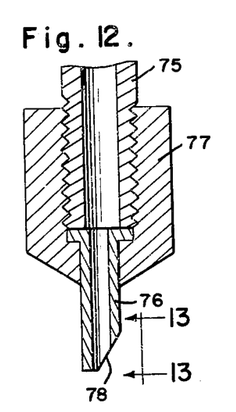
FIG. 12 is an enlarged cross-sectional view of the end of the discharge tube that is shown in FIGS. 5 and 6.
Figure 13:
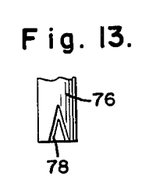
FIG. 13 is a side view of a portion of the structure shown in FIG. 12 taken along line 13—13.

A material discharge tube 74 which is the end of the chromatograph column generally indicated at 74 includes an elbow section 75 with a downwardly extending end portion on the end of which a needle tip 76 is held by means of seal cap 77 of heat resistant material such as, for example, Teflon (see FIG. 12). The lower surface of the seal cap 77 is tapered downwardly for creation of a seal with the bottle sealing cap 67, and the extended end of the needle tip 76 is provided with a V-shaped groove 78 (see FIGS. 12 and 13) for piercing the bottle caps 67 without creating a pressure surge.

Figure 4:
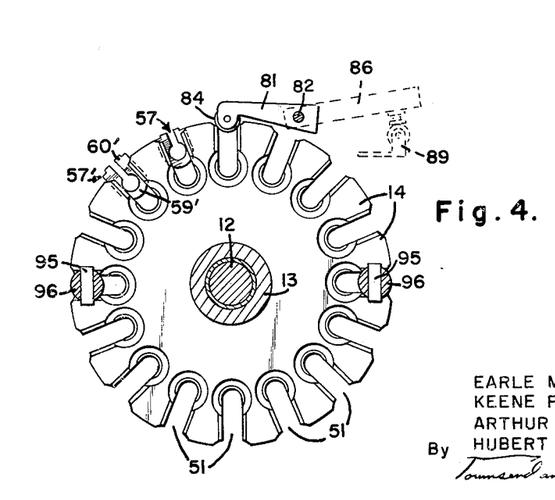
FIG. 4 is a view of a portion of the structure shown in FIG. 3 taken along line 4—4.
Figure 5:
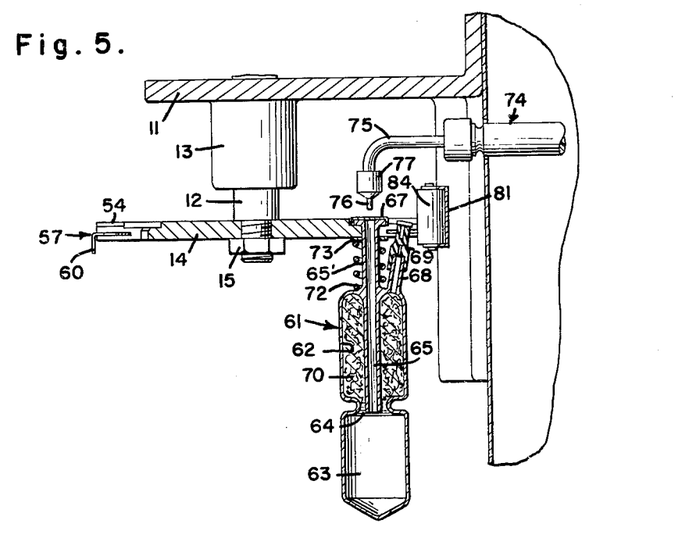
FIG. 5 is an enlarged elevational view, partially in section, showing a portion of the table provided with a collection bottle below a fluid discharge tube, the table being in a lowered position.

Referring now to FIGS. 1, 4 and 5 movement of the collection table is controlled by a lever arm 81 which is supported on the lower end of a vertical shaft 82 rotatably mounted in a bearing sleeve 83 on the frame 11. Rotatably mounted on a pin 80 at the free end of the lever arm 81 is a vertically aligned roller 84 which rolls on the periphery of the table 14 and into the notch or initial portion of the slots 51 as the table 14 is rotated. A switch lever 86 is fixedly secured on the upper end of the shaft 82 for actuating two switches 87 and 88 such as, for example, micro switches in accordance with the position of the lever arm 81. Each of the micro switches 87 and 88 has a switch arm 89 which is adjustably attached to the lever 86 by an adjusting screw 91 and a lock nut 92. The switch 87 stops the table 14 when the roller 84 rolls into the initial portion of the slots 51, while the switch 88 affects the termination of a collecting cycle and initiation of a repeat collection cycle. The operation of both of these switches will be described in the operational example set forth in detail below with reference to FIG. 14.

Referring now to FIGS. 2–4, a pair of indexing or positioning rollers 95 is provided with each of the rollers being rotatably held in the lower notched end of a vertically aligned roller holder shaft 96. The shafts 96 are supported on the frame 11 on opposite sides of the drive shaft 12 a distance such as to place the rollers 95 over the top beveled edges 54 of the slots 51. When the table 14 is raised to its elevated position for inserting the tip 76 of the discharge tube 74 into a collection bottle, these rollers 95 engage the beveled edges 54 to ensure proper positioning of the bottle inlet tube 65 beneath the needle tip 76 of the discharge tube 74.

The operation of the present invention will now be described with reference to the operation of a typical gas chromatograph of the type well known in the art, it being understood that the scope of the present invention includes the use of the apparatus described in other processes and with other associated apparatus.

Figure 14:
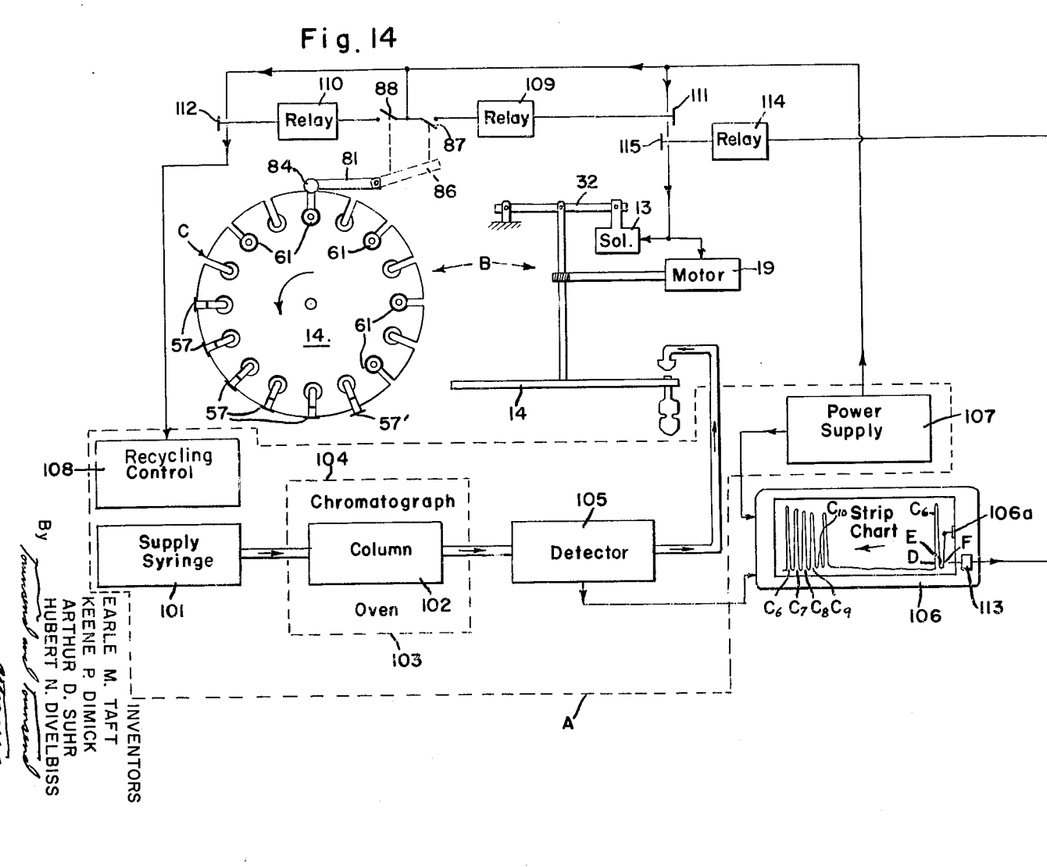
FIG. 14 is a schematic wiring diagram, partially in block form, illustrating the operation of the present invention.

Referring now to FIG. 14 which schematically illustrates operation of the invention, a gas chromatograph generally indicated at A for use in combination with a sample collection apparatus B includes a sample supplying syringe 101 for supplying a precise quantity of sample to a chromatograph column 102 contained within an oven 103 which is provided with an exhaust door 104. The material within the column 102 is directed through a detector 105 of a well known non-destructive variety and then through the discharge tube 74 into collection bottles in the collection apparatus. The output from the detector 105 is fed to a recorder 106 of, for example, the strip chart variety. A power supply 107 in the chromatograph besides supplying power to other portions of the chromatograph supplies electrical power to the recorder 106, and table drive motor 19, the solenoid 37, a recycling control 108 and switches 87 and 88 which are in turn connected to relays 109 and 110 respectively. Relay 109 upon activation opens a normally closed contact 111 in the power line to the motor 19 and solenoid 37, while relay 110 upon activation closes a normally open contact 112 in the power line to the recycling control 108.

The recorder 106 is provided with a trigger switch 113 for closing the relay 114 whenever the pen 106a of the recorder passes a particular level, this switch 113 being adjustable for selecting the level at which it is desired to collect or waste material from the discharge tube 74. Upon closing or activation, the relay 114 closes a normally open contact in the line between the contact 111 and the motor 19 and solenoid 37. When the switch 87 is closed, the relay 109 opens contact 111 to drop out the contact 115, and the switch 88 upon closing causes contact 112 to close to supply power to the recycling control 111. The contact 112 is opened in response to a signal from a timer (not shown) when the steps for initiating a new collection cycle have been completed.

Figure 6:
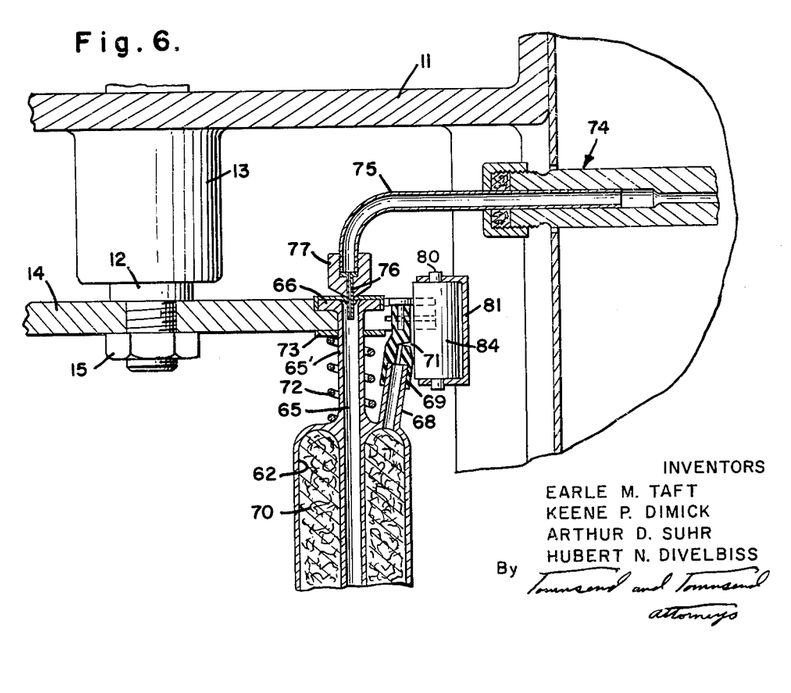
FIG. 6 is an enlarged view similar to FIG. 5 but with the table in elevated position.
Figure 7:
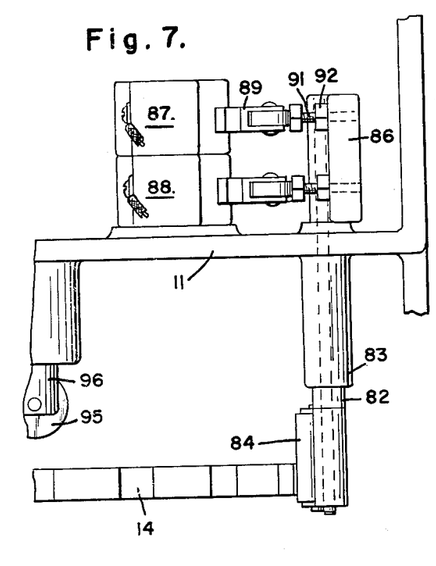
FIG. 7 is an elevational view showing a portion of the table, a lever arm positioned against the rotating table, and the switches actuated by the lever arm.
Figure 8:
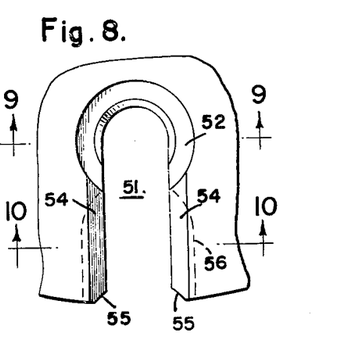
FIG. 8 is an enlarged plan view of a portion of the table showing one of the slots provided therein.
Figure 9:
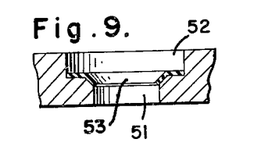
FIG. 9 is a cross-sectional view of the structure shown in FIG. 8 taken along line 9—9.
Figure 10:
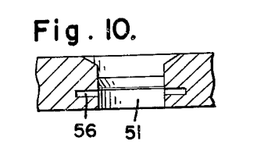
FIG. 10 is a cross-sectional view of the structure shown in FIG. 8 taken along line 10—10.

By way of example, the operation of the gas chromatograph and sample collection apparatus will now be described as utilized to collect the components of a 1.0 ml. sample containing n-alkanes $C_6$ to $C_{14}$. The sample was inserted in the chromatograph column 102 by the syringe 101, and after a length of time, the passage of the components was detected by the detector 105 and the recorder trace shown was produced. Initially, the lever arm 81 was positioned in raised position at the table notch indicated as C, and as the recorder pin 106a passed the level switch 113 at position D of the chart, relay 114 closed contact 115 connecting the solenoid 37 and table drive motor 19 to the power supply 107. Immediately, the solenoid 37 pulls its plunger 34 downward causing the lever rod 32 to force the drive shaft 12 and table 14 downward to the position shown in FIG. 2 and in which position the drive motor 19 causes the table 14 to rotate until the lever 81 entered the initial portion of the first slot 51 after position C. Upon entering this slot, the lever arm 81 caused rotation of the lever arm shaft 82 and the switch lever 86 closing the switch 87, opening the contact 111 and dropping out the contact 115, and thereby cutting off power to the solenoid 37 and the drive motor 19. Upon de-energization of the solenoid 37, the solenoid plunger 34 was released and the table drive shaft 12 with the table 14 attached thereto moved upward under the influence of the spring 23, the driving key 18 on the shaft 12 sliding within the keyway 17 on the gear 16. The air pot 41 and the leaf spring 46 caused smooth vertical movement of the table 14. As the table 14 rose to the position shown in FIG. 3, the rollers 95 nested in the slots 51 on the beveled edges 54 thereof precisely locating the discharge tube 74 in the center of the inlet tube 65 of one of the collection bottles 61. Upon upward movement of the table 14, the needle tip 76 of the discharge tube pierced the bottle sealing cap 67 and sealed the surface 79 of the sealing cap 77 to the bottle sealing cap 67. The roller 84 in the notch of the slot 51 applied horizontal pressure to the vent cap 69 on the bottle outlet tube 68 and opened the pressure exit opening 71 for passing carrier gas. Under those conditions as illustrated in FIG. 6, the component passing through the discharge tube 74 exhausted into the collection bottle through the inlet 65 and was collected in the bottle while the gas already in the bottle and the carrier gas exhausted through the opening 71.

The component $C_6$ was discharged into the collection bottle until the recorder pen advanced to chart position E at which time the level switch 113 again closed contact 115 and the solenoid 37 and table drive motor 19 again operated and advanced the table 14 to its next position. In this next position on the collection table 14 the slot 51 was left open without providing any collection bottle therein so that the material issuing from the discharge tube 74 between the time when the chart recorder pen moved from chart position E to position F wasted through the open slot 51. When the pen 106a reached position F, the level switch 113 again closed the contact 115 and moved the table to the next slot position which, as shown in FIG. 14, contained a collection bottle.

The cycle continued in this manner until the roller 84 on the lever arm reached the return clip 57' whereupon the switch 88 was closed causing relay 110 to close contact 112 and initiate the recycling control 108. The table continued to rotate, and the roller 84 passed the remaining slots in which by-pass clips were positioned until it returned to the start position in slot C.

The recycle control 108 then initiated the following steps: it opened the line to the recorder level switch to prevent initiation of movement of the table during the first stages of the recycling process, opened the oven door for cooling the oven and turned off the oven heater. The recycle control also caused the syringe 101 to be refilled and started a cool down timer which ran until the oven had cooled down to proper temperature for initiation of a new cycle. When the cool down timer had run, the oven door was then closed, the oven heater turned on, the sample injected into the column 102 and a precollection timer initiated. After the precollection timer had run, the line to the recorder level switch was closed so that the recorder was again in control of the collection process and initiated movement of the collection table when the recorder pen passed the recorder level switch.

As apparent from the above, when the present invention is utilized, on-column injections and automatic temperature programing of the chromatograph are possible. In the particular example given above a column ⅜" x 10' was used with substrate SE–30—30% on 60/80 firebrick and a helium flow rate of 200 ml./m. In repetitively temperature programed cycles from 70 to 200° C. the time of each cycle was 20 minutes with a column heat up time of 8 minutes and a column cool down time of 12 minutes. Each peak including the small $C_{10}$ peak was individually collected by refrigerating the collection bottles at 0° C. and gave better than 90% recoveries.

The collection bottles described above are extremely efficient and operate at room temperatures for materials boiling above 100° C. Both liquids and gases are collected in the bottles; the gases passing to the upper chamber 62 condense and return to the lower chamber 63. Typically, samples are removed from the bottles, after centrifugation, with an eye dropper drawn to a capillary.

The waste between two collected components may be collected by placing a collection bottle in the waste position slot. Alternatively, if a by-pass clip is positioned in two waste positions the waste will be collected in the collector bottle therebetween and the next component will be collected in the next collector bottle.

Any position may be by-passed by positioning one of the by-pass clips 57 in that slot, and the clips 57 and 57' may be utilized in a number of different ways by a person skilled in the art to produce different desired results.

As is apparent from the above the single collection table is constructed to perform a number of functions thereby avoiding the necessity of providing other complex timing wheels. The table 14 provides the slots for controlling the timing steps of the collection process to rotate and raise and lower the wheel and for either holding a collection bottle or serving as a waste hole. The slots also serve in combination with the indexing rollers for precisely aligning the bottles with the discharge tube.

Obviously in the broadest aspects of the invention the bottle supporting means need not be a circular table but may be any mechanism for advancing and raising and lowering the collection bottles for sealing onto the discharge tube during collection of a component. However, the circular table provides a number of advantages. It provides a simple compact construction providing all the functions mentioned above and permits easy refrigeration of the bottles since no interfering apparatus extends below the table.

Although the foregoing invention has been described in some detail by way of illustration and example for purposes of clarity of understanding, it is understood that certain changes and modifications may be practiced within the spirit of the invention as limited only by the scope of the appended claims.

We claim:

1. Sample collection apparatus in combination with a chromatograph including a plurality of collection bottles each having an inlet opening; means for supporting said collection bottles with the inlet opening directed vertically; a fluid discharge tube connected to the column of the chromatograph, positioned spaced from said bottle support means and adapted successively to pass the different fluid components of a sample passed into said chromatograph; and means for alternately horizontally moving and raising and lowering said bottle support means to seal the output end of said discharge tube successively to the inlet opening of each of said collection bottles to collect the desired components passing out of said discharge tube in time spaced intervals in separate collection bottles.

2. The apparatus of claim 1 including pressure exit means for relieving pressure within each of said bottles when the output end of said discharge tube enters each of said bottles whereby the desired components passing out of said discharge tube at time spaced intervals are collected in separate collection bottles under normal pressure, said pressure exit means including an outlet opening in each of said bottles located above the collection level for the fluid components in said bottle and gas pervious means located between said inlet opening and said outlet opening for passing out of each of said bottles during filling substantially only carrier gas and the gas originally contained within said bottle.

3. The apparatus of claim 1 including means for detecting the different components successively passing through said discharge tube, said moving, raising and lowering means being responsive to said detecting means to cause desired components to be collected in said separate collection bottles.

4. The apparatus of claim 3 characterized further in that said moving, raising and lowering means including means for returning said bottle support means to initial position after given components have been collected in separate bottles and means for inserting additional sample into said chromatograph, said detecting means and said moving, raising and lowering means responsive thereto causing each of said separate collection bottles to fill with one of said given components.

5. The apparatus of claim 1 including a sealing cap on the inlet opening of each of said bottles, a tubular needle insert provided on the output end of said discharge tube for piercing said sealing cap on the top of the collection bottles, said needle insert provided with a V-shaped groove on the tip thereof to prevent pressure surges when said needle insert pierces said sealing caps.

6. The apparatus of claim 1 wherein said collection bottle support means includes a circular table horizontally supported on a drive shaft, said table having a plurality of radial slots spaced about the periphery thereof and extending inwardly from the periphery a substantially equal length to a circle concentric with said drive shaft, each of said slots constructed and arranged to support one of said collection bottles and said moving, raising and lowering means includes a lever arm rotatably supported on said frame, said lever arm provided with a roller portion engaging the periphery of said table and partially rollable into said slots in said table, and means responsive to the position of said lever arm for stopping rotation of said drive shaft when the roller portion of said lever arm rolls into the initial portion of one of said slots and for moving said table vertically to cause said discharge tube to extend into one of said bottles.

7. The apparatus according to claim 1 including a plurality of collection bottles, each of said bottles having an upper chamber and a lower chamber, means providing communication between the bottom of said upper chamber and the top of said lower chamber, an inlet tube extending from said lower chamber exteriorly of said bottle, and an outlet tube extending from said upper chamber exteriorly of said bottle.

8. Sample collection apparatus comprising a circular table having a plurality of slots constructed and arranged to receive and support a plurality of collection bottles each of which has an inlet opening; a single fluid discharge tube positioned above said table; means for alternately rotating and raising and lowering said table to seal the output end of said discharge tube successively to the inlet opening of each of said collection bottles to collect the components passing out of said discharge tube at time spaced intervals in separate collection bottles; and pressure exit means for relieving pressure within each of said bottles when fluid components flow thereinto from the discharge tube sealed thereto.

9. Sample collection apparatus comprising in combination: a main frame; a table drive shaft; means for rotatably supporting said drive shaft from said frame, said shaft being slidable vertically of said frame; drive motor means for rotating said shaft; a circular table horizontally supported on said drive shaft, said table having a plurality of radial slots spaced about the periphery thereof and extending inwardly from the periphery a substantially equal length to a circle concentric with said drive shaft, each of said slots constructed and arranged to support a collection bottle on the table; a fluid discharge tube fixedly supported on said main frame above the circle around said table; and means for stopping rotation of said drive shaft and for moving said table vertically of said frame for successively sealably inserting the end of said discharge tube into a collection bottle supportable from said table.

10. The apparatus of claim 9 including a tubular needle insert provided on the output end of said discharge tube for piercing a cover cap on the top of the collection bottles, said needle insert provided with a V-shaped groove on the tip thereof to prevent pressure surges when said needle insert pierces said sealing caps.

11. The apparatus of claim 9 including positioning roller means located to engage a pair of said radial table slots when said table is moved vertically upwardly precisely to locate said discharge tube over the inlet tube of one of said collection bottles.

12. The apparatus according to claim 9 including a plurality of collection bottles each of which comprises an upper chamber; a lower chamber; means providing communication between the bottom of said upper chamber and the top of said lower chamber; an inlet tube providing communication between said lower chamber and the exterior of said bottle; and an outlet tube providing communication between the top of said upper chamber and the exterior of said bottle.

13. The apparatus of claim 9 wherein said moving and rotation stopping means including a lever arm rotatably supported on said frame, said lever arm provided with a roller portion engaging the periphery of said table and partially rollable into said slots in said table, means responsive to the position of said lever arm for stopping rotation of said drive shaft when the roller portion of said lever arm rolls into the initial portion of one of said slots and means responsive to the position of said lever arm for moving said table vertically of said frame when the roller portion of said lever arm is in the initial portion of one of said slots.

14. Apparatus according to claim 13 including clip means constructed and arranged for insertion into certain of said slots for preventing the roller portion of said lever arm from entering the initial portion of said certain slots.

15. Apparatus according to claim 13 including clip means constructed and arranged for insertion into one of said slots and projecting partially beyond the periphery of said table to cause said lever arm to roll radially outwardly of the periphery of said table and means responsive to the position of the lever arm to initiate other apparatus for a repeat cycle of the sample collection apparatus when the lever arm rolls radially outwardly from the table periphery.

16. Sample collection apparatus comprising in combination: a main frame; a table drive shaft; means for rotatably supporting said drive shaft from said frame, said shaft being slidable vertically of said frame; drive motor means for rotating said shaft; a circular table horizontally supported on said drive shaft, said table having a plurality of radial slots spaced about the periphery thereof and extending inwardly from the periphery a substantially equal length to a circle concentric with said drive shaft; a plurality of collection bottles, each of said bottles positioned in one of said table slots at the circle on the table and having an upper chamber and a lower chamber, means providing communication between the bottom of said upper chamber and the top of said lower chamber, an inlet tube extending from said lower chamber exteriorly of said bottle, an outlet tube extending from said upper chamber exteriorly of said bottle, a cover cup covering the outer end of said inlet tube, and a vent cap covering the outer end of said outlet tube and having a pressure exit opening therein; a fluid discharge tube fixedly supported on said main frame above the circle on said table on which said collection bottles are located; a tubular needle insert provided at the end of said discharge tube for piercing said bottle cover caps, said needle insert provided with a V-shaped groove on the tip thereof; a lever arm rotatably supported about a vertical axis on said frame, said lever arm provided with a roller portion engaging the periphery of said table and rollable into an initial portion of said slots in said table to bear against the vent cap of a bottle positioned therein to open the pressure exit opening of the bottle; means responsive to the position of said lever arm for stopping rotation of said drive shaft when the roller portion of said lever arm rolls into said slots; means responsive to the position of said lever arm for moving said table vertically of said frame when the roller portion of said lever arm is in the initial portion of one of said slots; by-pass clip means constructed and arranged for insertion into certain of said slots for preventing the roller portion of said lever arm from entering the initial portion of said certain slots; return clip means constructed and arranged for insertion into one of said slots and projecting partially beyond the periphery of said table to cause said lever arm to roll radially outwardly of said table and means responsive to the position of said lever arm to initiate other apparatus for a repeat cycle of the collection apparatus when the lever arm rolls radially outwardly from the table periphery; and positioning roller means located to engage a pair of said radial table slots when said table is moved vertically upwardly precisely to locate said discharge tube over the inlet tube of one of said collection bottles.

17. A sample collection bottle comprising in combination: an upper chamber; a lower chamber; means providing communication between the bottom of said upper chamber and the top of said lower chamber; an upwardly projecting inlet tube providing communication between said lower chamber and the exterior of said bottle and adapted to receive fluid directed downwardly thereinto; and an outlet tube providing communication between the top of said upper chamber and the exterior of said bottle.

18. A sample collection bottle comprising in combination: an upper chamber; a lower chamber; means providing communication between the bottom of said upper chamber and the top of said lower chamber; an inlet tube passing from said lower chamber vertically through said upper chamber and providing communication between said lower chamber and the exterior of said bottle; an outlet tube inclined at an angle with respect to said inlet tube and providing communication between the top of said upper chamber and the exterior of said bottle; said outlet tube provided with a vent cap having a pressure exit opening, said exit opening operable for movement from a closed position to an open position when horizontal pressure is applied sideways to said vent cap.

References Cited by the Examiner

UNITED STATES PATENTS

| | | | |
|---|---|---|---|
| 2,541,272 | 2/51 | Murphey | 141—329 X |
| 2,710,715 | 6/55 | Gorham | 141—130 |
| 2,723,790 | 11/55 | Speis et al. | 141—329 X |
| 2,737,812 | 3/56 | Haak | 73—425.4 |

OTHER REFERENCES

Kronmueller, in Gas Chromatography, 2nd International Symposium, ISA 1959, edited by Noebels et al., Academic Press, New York, 1961.

LOUIS R. PRINCE, *Primary Examiner.*

ROBERT L. EVANS, RICHARD C. QUEISSER,
*Examiners.*